Feb. 9, 1937. T. J. BURNS 2,070,420
SPONGE HOLDER
Filed May 20, 1935

Inventor
Thomas J. Burns
By A. S. Krotz
Attorney

Patented Feb. 9, 1937

2,070,420

UNITED STATES PATENT OFFICE 2,070,420

SPONGE HOLDER

Thomas J. Burns, Beloit, Wis.

Application May 20, 1935, Serial No. 22,362

2 Claims. (Cl. 15—244)

The object of my invention is to provide a simple holder for metal sponges, and certain fabric articles made into a bundle suitable for cleaning, scouring and washing kitchen utensils and the like and for cleaning, polishing, washing or scrubbing surfaces such as walls, floors and metal bodies.

Another object is to provide means whereby the aforesaid articles may be easily and quickly attached and detached.

Another object is to provide a holder which may be made entirely from wire and having means whereby the sponge is firmly but yieldingly held in position.

A still further object is to provide means whereby the holding device will not readily come in contact with the surface being cleaned, scrubbed or polished.

To these and other useful ends, my invention resides in parts and combination of parts or their equivalents as described and claimed and shown in the accompanying drawing in which:

Figure 1:
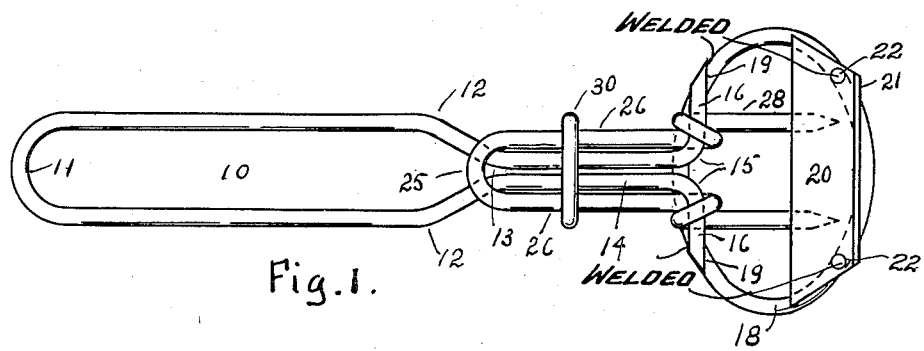
Figure 1 is a top view of my device, the movable member being in position for holding the sponge or pad in working position.

As thus illustrated the handle of the device is designated by reference numeral 10, and is formed by bending a wire midway its length as at 11, the ends thus formed are spaced apart and extend forward for a desired distance and are again bent as at 12, so as to converge to a point as at 13, where they are again bent so as to extend forward in closely spaced parallel relation forming the neck 14 of the device.

The wires forming the neck 14, are again bent as at 15, extending therefrom at right angle to the neck 14, forming bars 16—16, which terminate, as indicated, thus to provide a suitable base to which I attach a wire loop 18. This loop is, preferably, welded to bars 16, as at 19, whereby it forms a part of the handle assembly and is positioned preferably at an angle to the handle, as illustrated in Figure 2, thereby making it convenient for the operator to hold the sponge in any desired position while scouring or cleaning large flat surfaces or for cleaning the inside surfaces of pots, pans and containers of various sorts.

On the front top side of loop 18, I preferably provide a metal plate 20 which is preferably attached by spot welding as at 22—22, having an extended integral member 21, the outer edge of which is adapted to act as a scraper as is obviously a needed attachment in articles of the class.

The movable holding member of my device is formed from a piece of wire, first bent midway its length as at 25, forming two parallel bars 26—26, each being bent downwardly as at 27, (see Figure 2), each wire at a suitable distance from 27, being given, preferably, a single turn around bars 16, as illustrated in each of the figures, the ends of the wires extending forward, forming prongs 28 as indicated and terminating in suitable points 29. Thus members 16, will act as an axis upon which the movable member may turn.

Figure 2:
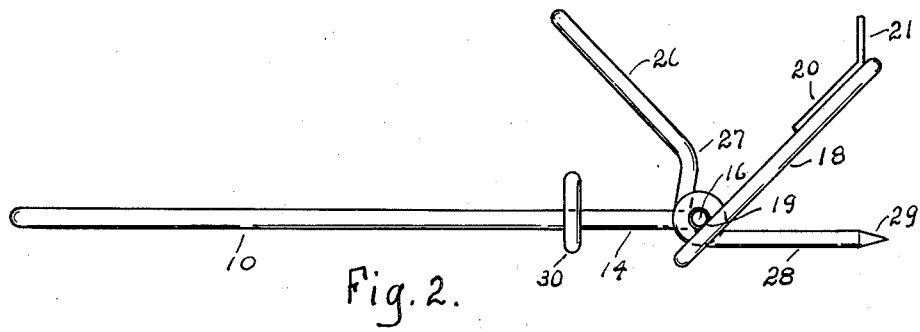
Figure 2 is a side view of the design shown in Figure 1, having the movable member in about the position required for placing the sponge over the holding prongs.
Figure 3:
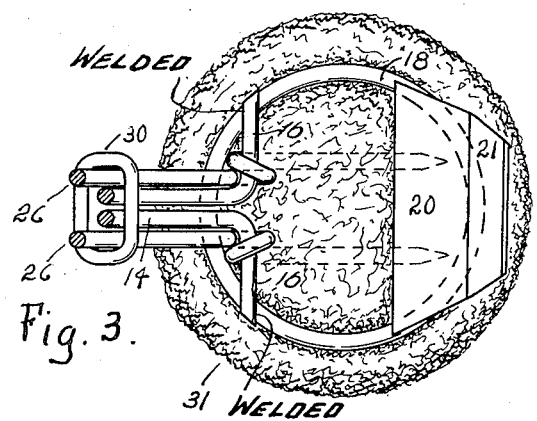
Figure 3 is a fractional view of the device wherein a conventional metal sponge is shown attached, this figure being shown from directly above the loop, and at right angles therefrom.

In Figure 2, the movable member is in position for attaching the sponge, first by inserting prongs 28, so a certain center portion of the sponge 31, is above these members, and then the prongs 28 are moved in the position shown in Figure 1. In this position the ends of the prongs will be in contact with the under side of plate 20, with perhaps some small portion of the sponge therebetween. The center portion of the sponge will be forced into the loop 18, as shown in Figure 3.

When the sponge and holder have been moved to the holding or working position, a locking device in the form of the loop 30, is pushed forward over members 26, thus to securely hold the sponge 31 in working position.

It will be noted by referring to Figure 2, that because of the bend at 27, member 26 will from its rear end extend forward at an ever increasing distance from the neck 14, therefore the loop 30, may be moved to whatever position is required to give the necessary tautness to the device; that is, the sponge will be pushed into the loop 18, making firm contact with the bottom surface of the loop, thus the sponge will be firmly held against movement and the bottom and edge will be available for service.

Clearly applicant's device is suitable as a holder for any kind of soft spongy material. It is, however, particularly adapted to hold what is commonly termed metal sponges or any material adaptable for similar use.

Sponges of the class are usually made into round pads of the proper diameter and thickness for holding in the hand while using. Metal sponges are rough and harmful to delicate skins, applicant's device is therefore especially adapted for kitchen use.

Applicant's plate 20, provides a surface against which the prongs 28 may rest, or pinch a portion of the sponge therebetween, and a flat surface upon which reading matter may easily be stamped. It will be understood that where the word sponge appears in this description or in the claims, that the word is used in a general sense, meaning a bundle, ball, pad or assembly of any suitable material for use on applicant's holder and for the purpose specified.

Having thus shown and described my invention I claim:

1. A sponge holder of the class described, comprising two members, one of said members comprising a handle having at its forward end transversely extending rods, a forwardly extending loop rigidly attached to the ends of said rods and locking means on said handle, the other member comprising two spaced wires forming a lever, each wire having a curve which embraces an adjacent rod forming spaced hinges, and the ends of said wires extending forwardly from said curves forming prongs which are adapted to penetrate a cleaning sponge, said prongs and lever positioned on opposite sides of said first member and shaped whereby a sponge penetrated by said prongs, will be held against the under side of said loop when said lever is moved adjacent the upper side of said handle, said lever when in said adjacent position, adapted to be adjustably engaged by said locking means.

2. A sponge holder of the class described, comprising two members, one of said members comprising a handle having at its forward end transversely extending rods, a forwardly extending loop rigidly attached to the ends of said rods, a plate lying flatwise on the top forward surface of said loop and a locking means on said handle, the other member comprising two spaced wires forming a lever, each wire having a curve which embraces an adjacent rod, forming spaced hinges and the ends of said wires extending forwardly from said curves, forming prongs which are adapted to penetrate a cleaning sponge, said prongs and lever positioned on opposite sides of said first member and shaped whereby a sponge penetrated by said prongs will be held against the under side of said loop and plate, when said lever is moved adjacent the upper side of said handle, said locking means adapted to engage said lever whereby to lock said prongs in their holding position.

THOMAS J. BURNS.